United States Patent
Furukawa

(10) Patent No.: US 8,583,932 B2
(45) Date of Patent: Nov. 12, 2013

(54) SIGNATURE DEVICE, SIGNATURE VERIFICATION DEVICE, ANONYMOUS AUTHETICATION SYSTEM, SIGNING METHOD, SIGNATURE AUTHENTICATION METHOD, AND PROGRAMS THEREFOR

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 57 days.

(21) Appl. No.: 13/320,130

(22) PCT Filed: May 13, 2010

(86) PCT No.: PCT/JP2010/058482
§ 371 (c)(1),
(2), (4) Date: Nov. 11, 2011

(87) PCT Pub. No.: WO2010/137508
PCT Pub. Date: Dec. 2, 2010

(65) Prior Publication Data
US 2012/0060028 A1 Mar. 8, 2012

(30) Foreign Application Priority Data
May 29, 2009 (JP) ................................ 2009-130644

(51) Int. Cl.
*H04L 9/32* (2006.01)

(52) U.S. Cl.
USPC ............................. 713/176; 713/156; 713/175

(58) Field of Classification Search
USPC .................. 713/156, 170, 175, 176, 180, 181
See application file for complete search history.

(56) References Cited

U.S. PATENT DOCUMENTS

| | | | |
|---|---|---|---|
| 2002/0007457 A1* | 1/2002 | Neff ............................... | 713/180 |
| 2002/0112166 A1* | 8/2002 | Jakobsson ..................... | 713/181 |
| 2009/0041239 A1* | 2/2009 | Teranishi ....................... | 380/46 |
| 2009/0287926 A1* | 11/2009 | Furukawa ..................... | 713/168 |

FOREIGN PATENT DOCUMENTS

| | | |
|---|---|---|
| JP | 2002341762 A | 11/2002 |
| JP | 2004005643 A | 1/2004 |
| JP | 2005064791 A | 3/2005 |
| JP | 2006108917 A | 4/2006 |
| WO | 2007135580 A | 11/2007 |

OTHER PUBLICATIONS

International Search Report for PCT/JP2010/058482 mailed Jun. 15, 2010.

(Continued)

*Primary Examiner* — Nirav B Patel

(57) ABSTRACT

[Problem]
Provided is an anonymous authentication system which can issue an anonymous authentication certificate that can hold any number of attributes.
[Means for Solving the Problem]
A signature device of the invention has a means for receiving the input from an authentication authority public key, an anonymous authentication certificate, a signature key, a text, an attribute proof set, and an attribute public key; a means for generating an attribute set representation value which generates an attribute set representation value from the attribute proof set and attribute public key which were input; a means for generating an attribute set representation key which generates an attribute set representation key from the attribute proof set; a means for generating non-interactive zero-knowledge proof which generates non-interactive zero-knowledge proof from the authentication authority public key, anonymous authentication certificate, signature key, and text which were input, and the attribute set representation value generated by the means for generating an attribute set representation value and the attribute set representation key generated by the means for generating an attribute set representation key; and a signature output means which outputs the non-interactive zero-knowledge proof as signature data.

16 Claims, 10 Drawing Sheets

(56) References Cited

OTHER PUBLICATIONS

M. H. Au et al., "Constant-Size Dynamic k-TAA", Security and Cryptography for Networks, 5th International Conference, SCN 2006, Springer, Lecture Notes in Computer Science, vol. 4116, 2006.

H. Maji et al., "Attribute Based Signatures: Achieving Attribute-Privacy and Collusion-Resistance", [online], Apr. 2008, pp. 1-23, [retrieved on Jun. 7, 2010], <URL: http://eprint.iacr.org/2008/328.pdf>.

K. Sako et al., "Selective Attributes Disclosure Scheme for Authentication Infrastructure management", Symposium on Cryptography and Information Security 2009 (SCIS2009), Jan. 2009.

Y. Tamura et al., "Anonymous Multiple Credential System", IEICE Technical Report, vol. 103, Nov. 2003.

* cited by examiner

SIGNATURE DEVICE, SIGNATURE VERIFICATION DEVICE, ANONYMOUS AUTHETICATION SYSTEM, SIGNING METHOD, SIGNATURE AUTHENTICATION METHOD, AND PROGRAMS THEREFOR

TECHNICAL FIELD

The invention relates to an anonymous authentication technology, in particular to a signature device, a signature verification device, and an anonymous authentication system.

BACKGROUND ART

An anonymous authentication is a technology in which a user (signer), to whom an anonymous authentication certificate with a plurality of attributes and a signature key confirmed thereby are provided by an authentication authority, and who possesses, is able to generate a signature which partially discloses the attributes of the anonymous authentication certificate to a provided text, by using these. From the signature, the disclosed attributes and the fact that the signature is generated by using a signature key based on an anonymous authentication certificate are only become clear.

When the anonymous authentication technology is utilized, for example, if a user has only to disclose a signature to an operator at an online-shop, it is possible to use a service without disclosing important individual information, like a credit card number, to the operator. The operator is not able to know the individual information of the user from the signature. But the operator can provide services to the user with ease and safely recover a service charge through the authentication authority, because the operator is able to know that the user is a member who is authenticated by the authentication authority (e.g. credit card company).

Being sensitive to leakage of individual information, a user intends to reduce the individual information which is disclosed to an operator. Meanwhile, since a cost for management of the individual information increases, an operator intends to reduce the stored individual information on users. Therefore, it is expected that the anonymous authentication technology can provide users and operators with a useful method for using the individual information.

An anonymous authentication signature system described in Non-patent document 1 is explained. FIG. 9 is an explanatory diagram illustrating a configuration of a signature device 500 which is a main element of the system. FIG. 10 is an explanatory diagram illustrating a configuration of a signature verification device 600 which is also a main element thereof.

Suppose that p is a prime number and a randomly-selected element $\gamma$ of a field (Z/pZ) is an authentication secret key. Public variables includes a natural number N, the prime number p, and character strings describing Group 1, Group 2, Group T, which are with an order p, a bilinear map e from Group 1 and Group 2 to Group T, an isomorphic map $\pi$ from Group 2 to Group 1, and a Hash function Hash mapping a character string to the field (Z/pZ). The public variable further includes a generator g[2] of Group 2, a generator g[1] of Group 1 where $\pi(g[2])=g[1]$, and elements h, h[1], ..., h[N] of Group 2 generated from an output of Hash function. A authentication authority public key y is described as $y=g[1]\gamma$.

An attribute of a signer comprises N elements of Z/pZ. Here, attributes of a signer S are denoted as $\theta[1], \ldots, \theta[N]$. The anonymous authentication certificate and the signature key of the signer are generated by interaction between the signer and the authentication authority through a communication line, and are the anonymous authentication certificate $(a, \omega)$ and the signature key $\xi$ which satisfy a relation represented in the formula (1) ($a \in $ Group 2, $\omega \in Z/pZ$, $\xi \in Z/pZ$).

$$a^{\gamma+\omega} = g[2]h^{\xi} \Pi_{i=1}^{N} h[i]^{\theta[i]} \qquad (1)$$

The signature device 500 shown in FIG. 9 includes a non-interactive zero-knowledge proof generation means 501. A text m to be signed, the authentication authority public key $y=g[1]\gamma$, the signature key $\xi$, the anonymous authentication certificate $(a, \omega)$, all the attributes $\theta[1], \ldots, \theta[N]$ which the signer possesses, a group $O \in \{1, \ldots, N\}$ which is information about which attributes are disclosed, and random numbers are inputted into the non-interactive zero-knowledge proof generation means 501 from the outside.

In response to these inputs, the non-interactive zero-knowledge proof generation means 501 generates a non-interactive zero-knowledge proof prf of the knowledge which satisfies the relation shown in the formula (2) with respect to g[1], g[2], h, h[i], $\theta[i]$, and y. The prf is a selected attributes disclosure signature (signature).

$$e(yg[1]^{\Omega}, A) = e(g[1], g[2])h^{\Xi} \Pi_{i \in \{1, \ldots, N\}} h[i]^{\Theta[i]} \cdot \Pi_{i \in O} h[i]^{\theta[i]}, (A \in \text{Group2}, \Omega \in Z/pZ, \Xi \in Z/pZ, \{\Xi[i] \in Z/pZ\}_{i \in \{1, \ldots, N\}}) \qquad (2)$$

The signature verification device 600 shown in FIG. 10 includes a non-interactive zero-knowledge proof verification means 601. The authentication authority public key $y=g[1]\gamma$, g[1], g[2], h, h[i] (i=1, ..., N), disclosed attributes $\theta[i]$ ($i \in O$), the text m, and the signature prf are inputted into the non-interactive zero-knowledge proof verification means 601.

In response to these inputs, the non-interactive zero-knowledge proof verification means 601 outputs an "receipt/refusal of receipt" signal indicating whether or not the signature prf which is the non-interactive zero-knowledge proof is a non-interactive zero-knowledge proof of the knowledge which satisfies the relation shown in the formula (3).

$$e(yg[1]^{\Omega}, A) = e(g[1], g[2])h^{\Xi} \Pi_{i \in \{1, \ldots, N\}} h[i]^{\Theta[i]} \cdot \Pi_{i \in O} h[i]^{\theta[i]}, (A \in \text{Group2}, \Omega \in Z/pZ, \Xi \in Z/pZ, \{\Theta[i] \in Z/pZ\}_{i \in \{1, \ldots, N\}}) \qquad (3)$$

In relation to the technology, the following Patent documents are disclosed. Patent document 1 describes an electronic signature deputizing method which enables a non-user of a key to use the key under conditions the user of the key registered in advance. Patent document 2 describes an anonymous authentication technology where an anonymous public key is made from a proper public key, and authentication is conducted by using the anonymous public key and a proper secret key. Patent document 3 describes a digital signature technology in which load of an authentication authority conducting authentication is reduced by using an attribute certificate, a validity certificate, a time stamp and the like, together with a public key.

RELATED ART DOCUMENTS

Patent Document

[Patent document 1] Japanese Patent Application Laid-Open No. 2002-341762
[Patent document 2] Japanese Patent Application Laid-Open No. 2005-064791
[Patent document 3] Japanese Patent Application Laid-Open No. 2006-108917

Non-Patent Document

[Non-Patent document 1] Man Ho Au, Willy Susilo, Yi Mu: Constant-Size Dynamic k-TAA. Security and Cryptography for Networks, 5th International Conference, SCN 2006, Maiori, Italy, Sep. 6-8, 2006, Proceedings (SCN) pp. 111-125, Springer, Lecture Notes in Computer Science, volume 4116, ISBN 3-540-38080-9.

SUMMARY OF THE INVENTION

Problem to be Solved by the Invention

The anonymous authentication technology described above preliminarily limits the number of attributes which a signer can hold. This means that N attributes are fixed when an anonymous authentication certificate is generated, and that a new attribute other than the N attributes is not able to be acquired. That is, it is necessary to invalidate a former anonymous authentication certificate once and to newly issue an anonymous authentication certificate, in order to acquire a new attribute. The invalidating process cannot be frequently conducted, because the process affects a public key and imposes some processes on the other signers.

However, a process to give an attribute with an expiration date to a signer, who is a member of the real society, and further give an attribute with a next expiration date when due thereto frequently occurs in the real society, for example, like a case in which a signer has a new credit card and renews the expiration date of the credit card. Though it is needed that an attribute, which the signer possesses, is easily added in order to quickly conduct these processes, having difficulty in adding the attribute, the anonymous authentication technology above-mentioned lacks convenience in the process which frequently may occur.

Since the above-mentioned anonymous authentication technology proves, by zero-knowledge, knowledge of each attribute which is not disclosed, data and calculation which are required for the proof corresponding to each attribute are piled up and a length of a selected attributes disclosure signature becomes long. Since the length of the selected attributes disclosure signature, therefore, is proportional to the number of the attributes which are not disclosed, calculation amount required for the process increases. This means that operations for selecting large N, for holding the anonymous authentication certificate wholly including attributes which are not frequently used, and for generating the selected attributes disclosure signature disclosing only a small number of required attributes, are not efficient.

Configurations solving the problems described above are not described in Non-Patent document 1 and Patent documents 1 to 3.

An object of the invention is to provide a signature device, a signature verification device, an anonymous authentication system, a signing method, a signature verification method, and programs therefor which make it possible to issue the anonymous authentication certificate where a signer can have any number of attributes and the length of the signature is not affected by the number of attributes which are not disclosed and the number of attributes which are disclosed.

Means for Solving the Problems

A signature device has means for receiving inputs of an authentication authority public key, an anonymous authentication certificate, a signature key, a text, an attribute proof set, and an attribute public key, attribute set representation value generation means for generating an attribute set representation value from the inputted attribute proof set and the inputted attribute public key, attribute set representation key generation means for generating an attribute set representation key from the attribute proof set, non-interactive zero-knowledge proof generation means for generating a non-interactive zero-knowledge proof from the authentication authority public key, the anonymous authentication certificate, the signature key, and the text, that are inputted therein, the attribute set representation value generated by the attribute set representation value generation means, and the attribute set representation key generated by the attribute set representation key generation means, and signature output means for outputting the non-interactive zero-knowledge proof as signature data.

A signature verification device has means for receiving inputs of an authentication authority public key, an attribute public key, one or more attributes, a text, and signature data including a non-interactive zero-knowledge proof, attribute set representation value generation means for generating an attribute set representation value from the inputted attributes and the inputted attribute public key, and non-interactive zero-knowledge proof verification means for determining whether or not the signature data is a proper signature with respect to the text under disclosure of the attributes by the authentication authority public key, the text, and the attribute set representation value generated by the attribute set representation value generation means and for outputting the result thereof.

An anonymous authentication system includes a signature device that is characterized in comprising means for receiving inputs of an authentication authority public key, an anonymous authentication certificate, a signature key, a text, an attribute proof set, and an attribute public key, attribute set representation value generation means for generating an attribute set representation value from the attribute proof set and the attribute public key, attribute set representation key generation means for generating an attribute set representation key from the attribute proof set, non-interactive zero-knowledge proof generation means for generating non-interactive zero-knowledge proof from the authentication authority public key, the anonymous authentication certificate, the signature key, the attribute set representation value generated by the attribute set representation value generation means, and the attribute set representation key generated by the attribute set representation key generation means, and signature output means for outputting the non-interactive zero-knowledge proof as signature data, and a signature verification device that is characterized in comprising means for receiving inputs of the authentication authority public key, the attribute public key, one or more attributes, the text, and the signature data including the non-interactive zero-knowledge proof, attribute set representation value generation means for generating the attribute set representation value from the attributes and the attribute public key, and non-interactive zero-knowledge proof verification means for determining whether or not the signature data is a proper signature with respect to the text under disclosure of the attributes by the authentication authority public key, the text, and the attribute set representation value generated by the attribute set representation value generation means, and for outputting the result thereof.

A signing method is characterized in causing a computer to execute following processes: receiving inputs of an authentication authority public key, an anonymous authentication certificate, a signature key, a text, an attribute proof set, and an attribute public key, generating an attribute set representation value from the attribute proof set and the attribute public key, generating an attribute set representation key from the attribute proof set, generating a non-interactive zero-knowledge proof from the authentication authority public key, the anonymous authentication certificate, the signature key, the text, the generated attribute set representation value, and the generated attribute set representation key, and outputting the non-interactive zero-knowledge proof as signature data.

A signature authentication method is characterized in causing a computer to execute following processes: receiving inputs of an authentication authority public key, an attribute public key, one or more attributes, a text, and signature data including a non-interactive zero-knowledge proof, generating an attribute set representation value from the attributes and the attribute public key, and determining whether or not the signature data is a proper signature with respect to the text under disclosure of the attributes by the authentication authority public key, the text, and the generated attribute set representation value, and outputting the result thereof.

A signature program is causing a computer to execute: a step of receiving inputs of an authentication authority public key, an anonymous authentication certificate, a signature key, a text, an attribute proof set, and an attribute public key, a step of generating an attribute set representation value from the attribute proof set and the attribute public key, a step of generating an attribute set representation key from the attribute proof set, a step of generating a non-interactive zero-knowledge proof from the authentication authority public key, the anonymous authentication certificate, the signature key, the text, the generated attribute set representation value, and the generated attribute set representation key, and a step of outputting the non-interactive zero-knowledge proof as the signature data.

A signature verification program is causing a computer to execute: a step of receiving inputs of an authentication authority public key, an attribute public key, one or more attributes, a text, and signature data including a non-interactive zero-knowledge proof, a step of generating an attribute set representation value from the attributes and the attribute public key, and a step of determining whether or not the signature data is a proper signature with respect to the text under disclosure of the attributes by the authentication authority public key, the text, and the generated attribute set representation value, and outputting the determined result.

Effects of the Invention

Since the invention is configured to allocate only one public key to all the attributes and to generate the non-interactive zero-knowledge proof from the anonymous authentication certificate corresponding to each attribute and output as signature data, as described above, only one public key is required and data of the non-interactive zero-knowledge proof does not include a value corresponding to each attribute. Provided is the signature device, the signature verification device, the anonymous authentication system, the signing method, the signature verification method, and programs therefor which includes characteristics in which a signer can have any number of attributes and it is possible to issue the anonymous authentication certificate where the length of the signature is not affected by the number of the attributes which are not disclosed and the number of the attributes which are disclosed.

REFERENCE SIGNS LIST

1 ANONYMOUS AUTHENTICATION SYSTEM
10 SIGNER DEVICE
20 OPERATOR DEVICE
30 AUTHENTICATION AUTHORITY DEVICE
40 NETWORK
100 COMPUTER DEVICE
11, 21, 31, 101 CPU
102 RAM
32, 103 HDD
104 NIC
200 SELECTED ATTRIBUTES DISCLOSURE SIGNATURE UNIT
201 ATTRIBUTE SET REPRESENTATION VALUE GENERATION MEANS
202 ATTRIBUTE SET REPRESENTATION KEY GENERATION MEANS
203 TRACKING CIPHERTEXT GENERATION MEANS
204 LINKAGE INDENTIFIER GENERATION MEANS
205 NON-INTERACTIVE ZERO-KNOWLEDGE PROOF GENERATION MEANS
206 SIGNATURE OUTPUT MEANS
210 SIGNATURE DEVICE
300 SELECTED ATTRIBUTES DISCLOSURE SIGNATURE VERIFICATION UNIT
301 ATTRIBUTE SET REPRESENTATION VALUE GENERATION MEANS
302 LINKAGE IDENTIFIER AND CHARACTER STRING INPUT MEANS
303 NON-INTERACTIVE ZERO-KNOWLEDGE PROOF VERIFICATION MEANS
310 SIGNATURE VERIFICATION DEVICE
410 ATTRIBUTE ADDING UNIT
420 ATTRIBUTE ACQUIRING UNIT
430 TRACKING UNIT
440 INVALIDATING UNIT
450 KEY RENEWAL UNIT
460 MEMBER LIST L

MOST PREFERRED MODE FOR CARRYING OUT THE INVENTION

Embodiment

A configuration of an embodiment of the invention is described below, referring to attached FIGS. 1 to 4, FIG. 6, and FIG. 8.

Initially, a basic content of the embodiment is explained and, after that, a detailed content is described.

Figure 3:
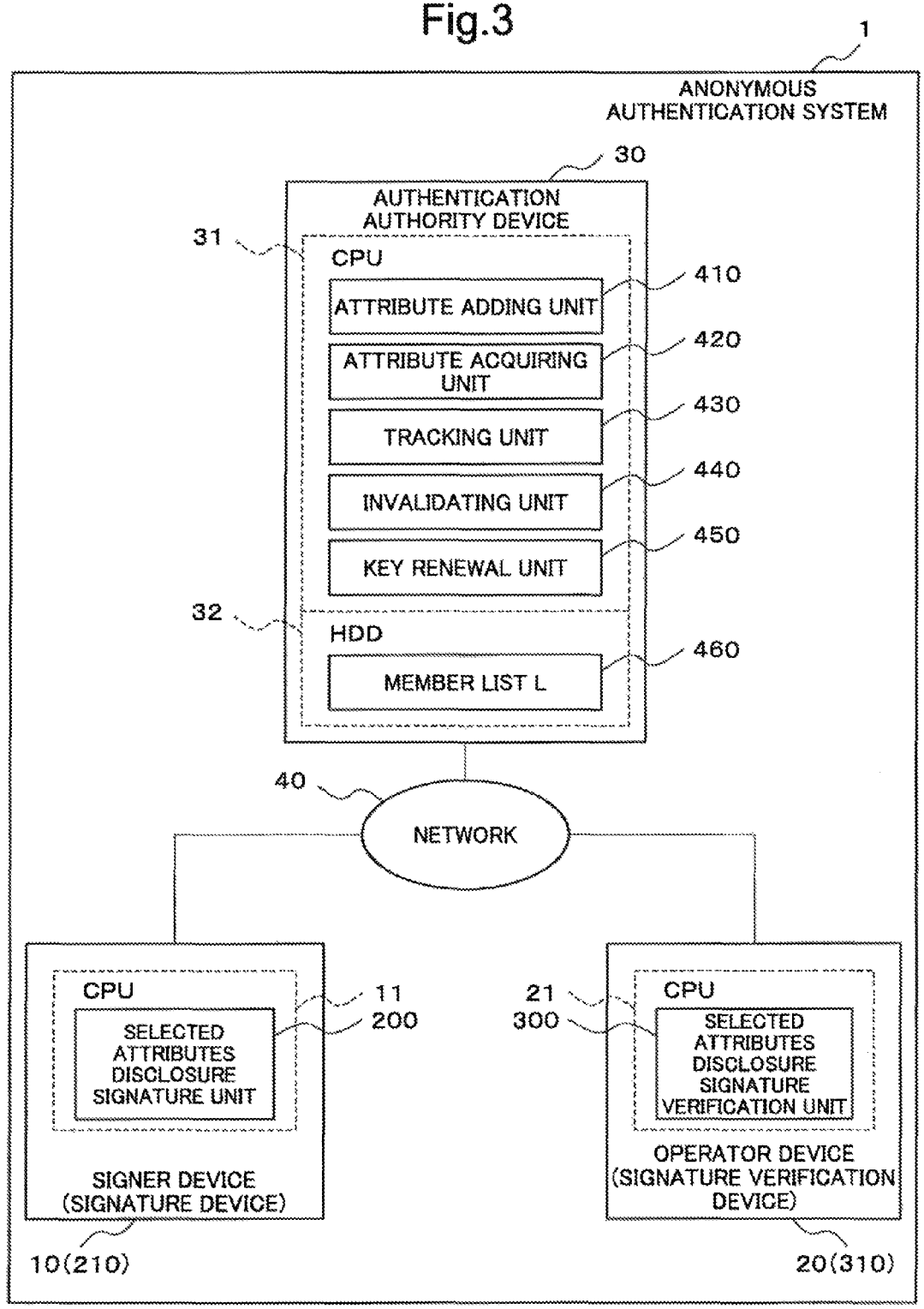
FIG. 3 An explanatory diagram illustrating a schematic configuration of each operation unit included in the signer device, the operator device and the authentication authority device shown in FIG. 1.

A signature device of the embodiment (c.a. signature device 210 in an anonymous authentication system 1 in FIG. 3), initially receives inputs of an authentication authority public key, an anonymous authentication certificate, a signature key, a text, an attribute proof set, and an attribute public key, and generates signature data therefrom. The signature device 210 comprises a selected attributes disclosure signature unit 200, for example, shown in FIG. 4. In this case, the signature device 210 (selected attributes disclosure signature unit 210) includes an attribute set representation value generation unit 201, an attribute set representation key generation unit 202, a non-interactive zero-knowledge proof generation unit 205, and a signature output unit 206. The attribute set representation value generation unit 201 generates an attribute set representation value from the inputted attribute proof set and the inputted attribute public key. The attribute set representation key generation unit 202 generates an attribute set representation key from the inputted attribute proof set. The non-interactive zero-knowledge proof generation unit 205 generates a non-interactive zero-knowledge proof from the authentication authority public key, the anonymous authentication certificate, the signature key, and the text, which are inputted therein, and the generated attribute set representation value, and the generated attribute set representation key. The signature output unit 206 outputs the non-interactive zero-knowledge proof as the signature data.

As details being described below, the attribute proof set is a set of one or more pairs of an attribute to be disclosed and an attribute key corresponding to the attribute. The attribute public key comprises one or more elements of a cyclic group, the number of which is proportional to the number of attributes that is simultaneously disclosable. The attribute set representation value is the sum of results obtained by multiplying each element of the attribute public key by a coefficient calculated from the values of the attributes included in the attribute proof set. The attribute set representation key is the sum of results obtained by multiplying each element of the attribute key included in the attribute proof set by a coefficient calculated from the values of the attributes included in the attribute proof set.

The signature device 210 may further include a tracking ciphertext generation unit 203 which generates a tracking ciphertext from random numbers, a tracking public key, the authentication authority public key, and the signature key, which are inputted therein. In this case, the non-interactive zero-knowledge proof generation unit 205 generates the non-interactive zero-knowledge proof from the authentication authority public key, the anonymous authentication certificate, the signature key, the text, the attribute set representation value, the attribute set representation key, the tracking ciphertext, and the random numbers.

The signature device 210 may include a linkage identifier generation unit 204 generating a linkage identifier from the inputted authentication authority public key, a determiner indicating whether or not the linkage identifier is generated, and a linkage character string. In this case, the non-interactive zero-knowledge proof generation unit generates the non-interactive zero-knowledge proof from the authentication authority public key, the anonymous authentication certificate, the signature key, the text, the attribute set representation value, the attribute set representation key, the linkage character string, the linkage identifier, and the random numbers.

Figure 6:
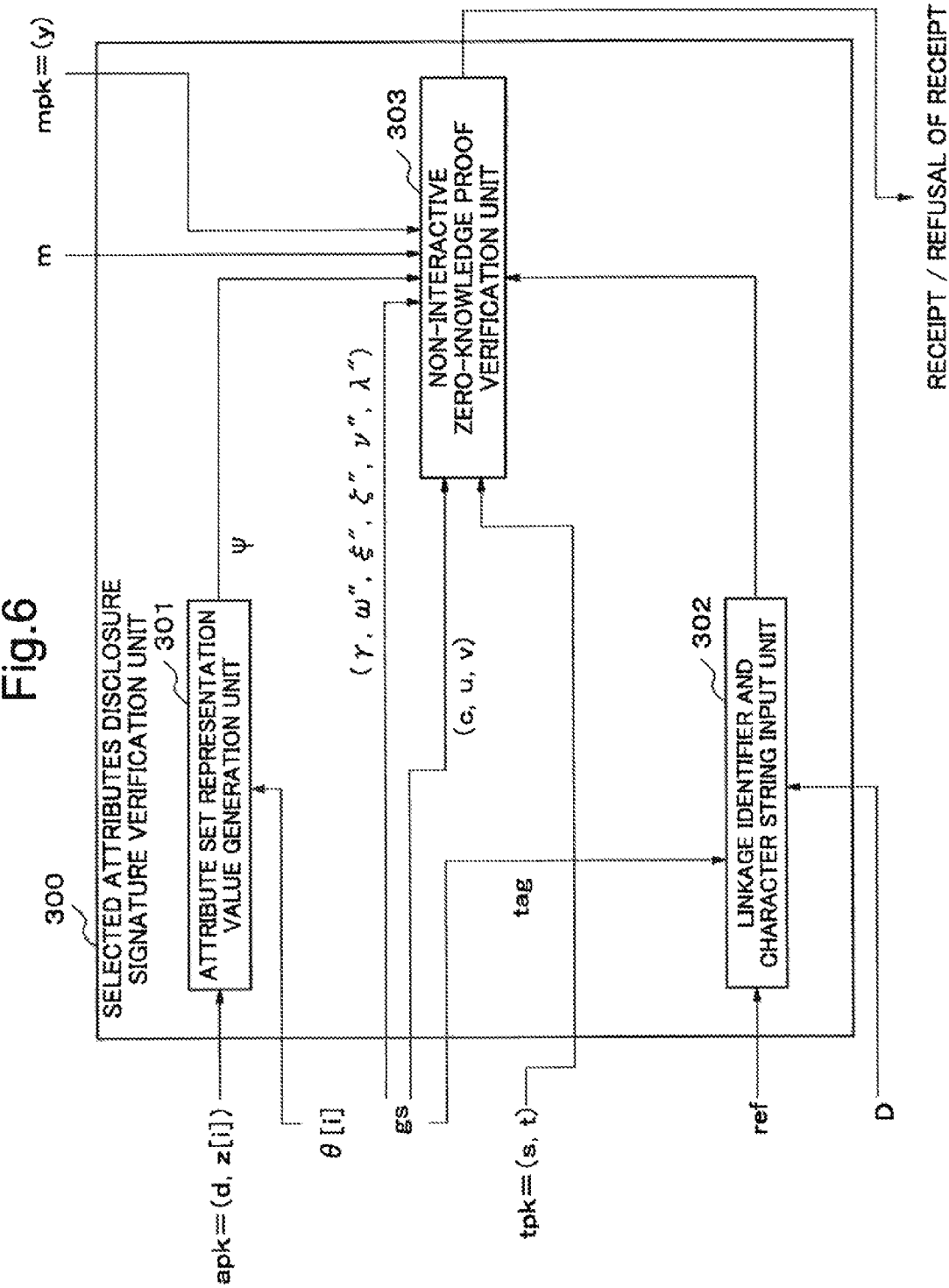
FIG. 6 An explanatory diagram illustrating a detailed configuration of the signature verification device shown in FIG. 1 and FIG. 3.

Next, a signature verification device of the embodiment (e.g. signature verification device 310 in an anonymous authentication system 1 in FIG. 3) receives inputs of the authentication authority public key, the attribute public key, the attributes, the text, and the signature data including the non-interactive zero-knowledge proof, verifies whether or not the signature data is proper therefrom, and outputs the result. The signature verification device 310 comprises a selected attributes disclosure signature verification unit 300, for example, as shown in FIG. 6. In this case, the signature verification device 310 (selected attributes disclosure signature verification unit 300) includes an attribute set representation value generation unit 301 and a non-interactive zero-knowledge proof verification unit 303. The attribute set representation value generation unit 301 generates the attribute set representation value from the inputted attributes and the inputted attribute public key. The non-interactive zero-knowledge proof verification unit 303 determines whether or not the signature data is a proper signature with respect to the text under disclosure of the attributes by the authentication authority public key, the attribute set representation value, and the text, and outputs the result thereof.

As mentioned above, the attribute public key comprises a plurality of elements of the cyclic group, the number of which is proportional to the number of attributes that is simultaneously disclosable, and the attribute set representation value is the sum of results obtained by multiplying each element of the attribute public key by a coefficient calculated from the values of the attributes.

The non-interactive zero-knowledge proof verification unit 303 determines whether or not the signature data is a proper signature with respect to the text by the authentication authority public key, the attribute set representation value, the text, the tracking public key, and the tracking ciphertext.

The signature verification device 310 (selected attributes disclosure signature verification unit 300 in FIG. 6) includes a linkage identifier and character string input unit 302. The linkage identifier and character string input unit 302 receives a linkage identifier, a linkage character string, and a determiner indicating whether to generate the linkage identifier, and outputs the linkage identifier and the linkage character string to the non-interactive zero-knowledge proof verification unit 303 depending on the value of the determiner. In this case, the non-interactive zero-knowledge proof verification unit 303 determines whether or not the signature data is a proper signature with respect to the text by the authentication authority public key, the attribute set representation value, the text, the linkage identifier, and the linkage character string.

As shown in FIG. 3, the anonymous authentication system 1 of the embodiment includes the signature device 210 and the signature verification device 310 as mentioned above. The signature device 210 receives inputs of the authentication authority public key, the anonymous authentication certificate, the signature key, the text, the attribute proof set, and the attribute public key, and generates the signature data therefrom as described above. The signature verification device 310 receives inputs of the authentication authority public key, the attribute public key, the attribute, the text, and the signature data form the signature device 210, verifies whether or not the signature data is proper therefrom, and outputs the result thereof.

Figure 8:
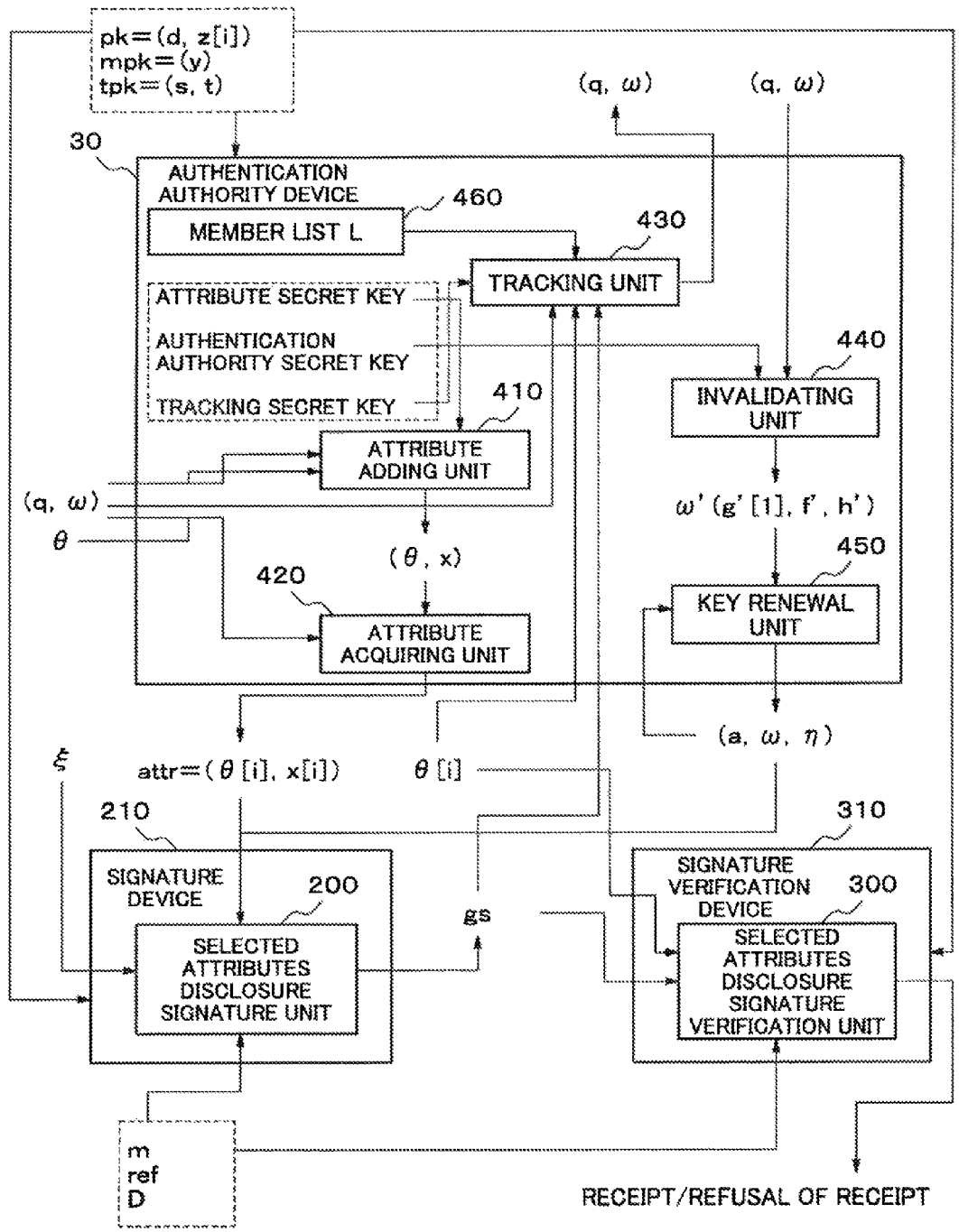
FIG. 8 An explanatory diagram illustrating a configuration on an operation of each operation unit of the anonymous authentication signature system shown in FIG. 1 and FIG. 3.
Figure 9:
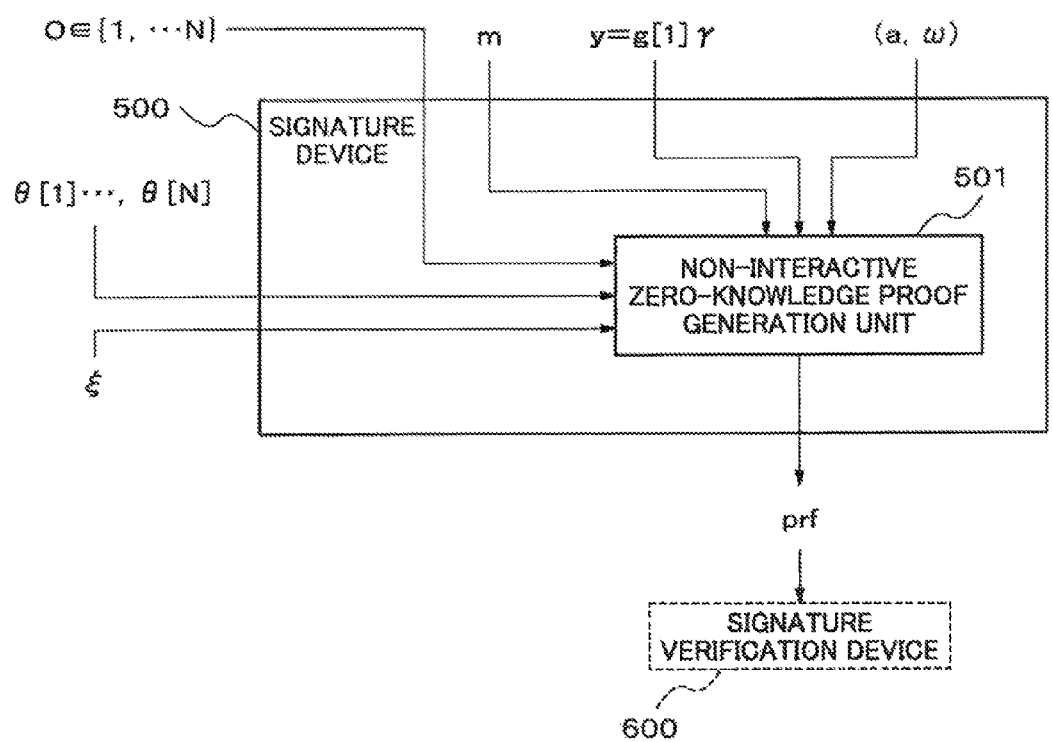
FIG. 9 An explanatory diagram illustrating a configuration of the signature device on the existing anonymous authentication signature system described in Non-Patent document 1.
Figure 10:
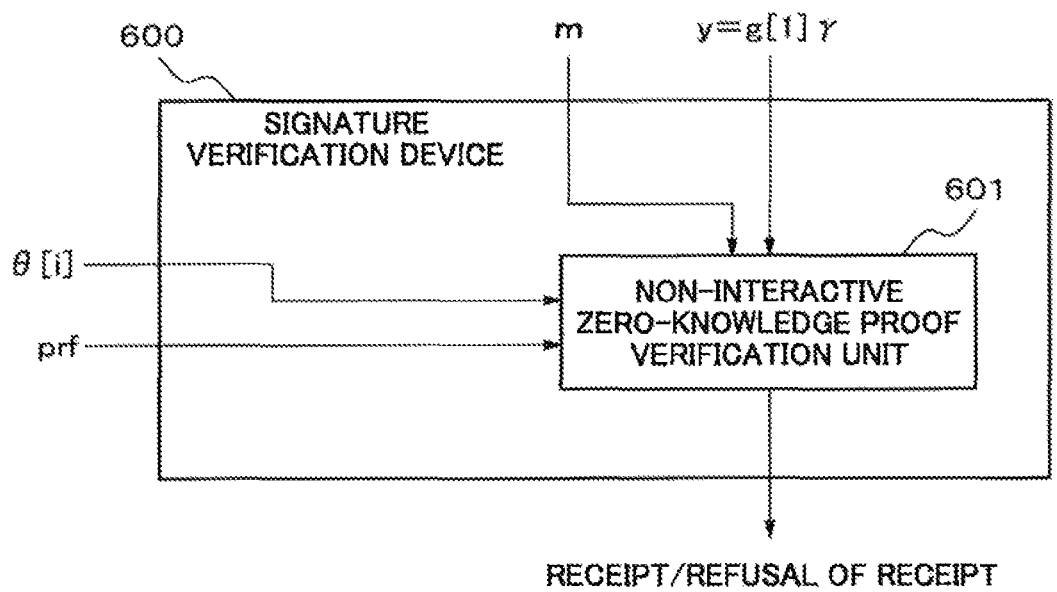
FIG. 10 An explanatory diagram illustrating a configuration of the signature verification device on the existing anonymous authentication signature system described in Non-Patent document 1.

The anonymous authentication system 1 may further include an authentication authority device 30 mutually connected to the signature device 210 and the signature verification device 310. The authentication authority device 30 includes an attribute adding unit 410 and an attribute acquiring unit 420 as shown in FIG. 8. The attribute adding unit 410 generates an attribute proof from the authentication authority public key, an attribute secret key, the attribute public key, a member list, signer information, and the attribute, which are inputted therein. The attribute acquiring unit 420 outputs data representing rejection or receipt by the authentication authority public key, the attribute public key, and the attribute proof, which are inputted therein.

The signature device 210 in the anonymous authentication system 1 may include the tracking ciphertext generation unit 203 generating the tracking ciphertext from the random numbers, the tracking public key, the authentication authority public key, and the signature key, which are inputted therein. In this case, the non-interactive zero-knowledge proof generation unit 205 generates the non-interactive zero-knowledge proof from the authentication authority public key, the anonymous authentication certificate, the signature key, the text, the attribute set representation value, the attribute set representation key, the tracking ciphertext, and the random numbers. The non-interactive zero-knowledge proof verification unit 303 in the signature verification device 310 determines whether or not the signature data is a proper signature with respect to the text by the authentication authority public key, the attribute set representation value, the text, the tracking public key, and the tracking ciphertext. The authentication authority device 30 includes a tracking unit 430, an invalidating unit 440, and a key renewal unit 450. The tracking unit 430 generates the signer information from the authentication authority public key, the attribute public key, a tracking secret key, the tracking public key, the member list, the signature, the attribute, and a message. The invalidating unit 440 generates invalidation information from an authentication authority secret key, the authentication authority public key, the member list, and a part of the signer information. The key renewal unit 450 renews the anonymous authentication certificate from the authentication authority public key, the attribute public key, the signature key, the anonymous authentication certificate, and the invalidation information.

The anonymous authentication system 1 can issue the anonymous authentication certificate in which a signer can have any number of attributes, and the length of the signature is not affected from the number of the attributes which are not disclosed and the number of the attributes which are disclosed.

The above descriptions are explained in detail.

Basic Operations of the Embodiment

In the specification, p is a prime number, N is a natural number, each of Group 1, Group 2, group T, and group E is a group with order p, and a bilinear map e from the Group 1 and Group 2 to the group T exists. The group E is, for example, a multiplicative group on a prime field, a general elliptic curve, or the like, and is a group in which it is difficult to solve Decision Diffie-Hellman problem. $\pi$ is an isomorphic map from Group 2 to Group 1.

Hash is Hash function which maps a character string to a field (Z/pZ). Hash[E] is Hash function which maps a character string to the group E. g[2] is a generator of Group 2, and g[1] is a generator of Group 1 where $\pi(g[2])=g[1]$. g is a generator of the group E. f and h are elements of Group 1 which are randomly selected. Public variables param are p, N, g[1], g[2], g, f, h, and character strings which describe Group 1, Group 2, Group T, the bilinear map e, the isomorphic map $\pi$, Hash function Hash which maps a character string to Z/pZ, and a Hash function Hash[E] which maps a character string to group E.

An authentication authority secret key $\phi$ is an element of the field Z/pZ, which is randomly selected. The authentication authority public key is $y=g[2]\phi$. $\psi$ is an element of the field Z/pZ, which is randomly selected. d is an element of Group 1, which is randomly selected. With respect to i=1, ..., N, $\psi[i]=\psi i$, and $z[i]=g[2]\psi[i]$ hold. The attribute secret key is $\psi$, the attribute public key is d, z[i] (I=1, ..., N).

$\sigma$ and $\tau$ are two points on the field Z/pZ, which are randomly selected. Suppose that s and t are $s=g\sigma$ and $t=g\tau$, respectively. It is defined that the tracking secret key is $(\sigma, \tau)$, and the tracking public key is (s, t).

A signer is preliminarily given, from an authentication authority, a signature key $\xi \in Z/pZ$ which is randomly selected, an anonymous authentication certificate $(a, \omega, \eta)$ satisfying the formula (4), and an identifier q satisfying the formula (5).

$$e(a,yg[2]^\omega)e(f^\xi,g[2])e(h^\eta,g[2])=e(g[1],g[2]),(a\in\text{Group }1,\omega\in Z/pZ,\eta\in Z/ZpZ) \quad (4)$$

$$q=g^\xi \quad (5)$$

A signer information (q, $\omega$), and an attribute proof set attr are generated for each identifying person and stored in a member list L described below. An initial value of the attribute proof set attr is an empty set.

Anonymous Authentication System

Figure 1:
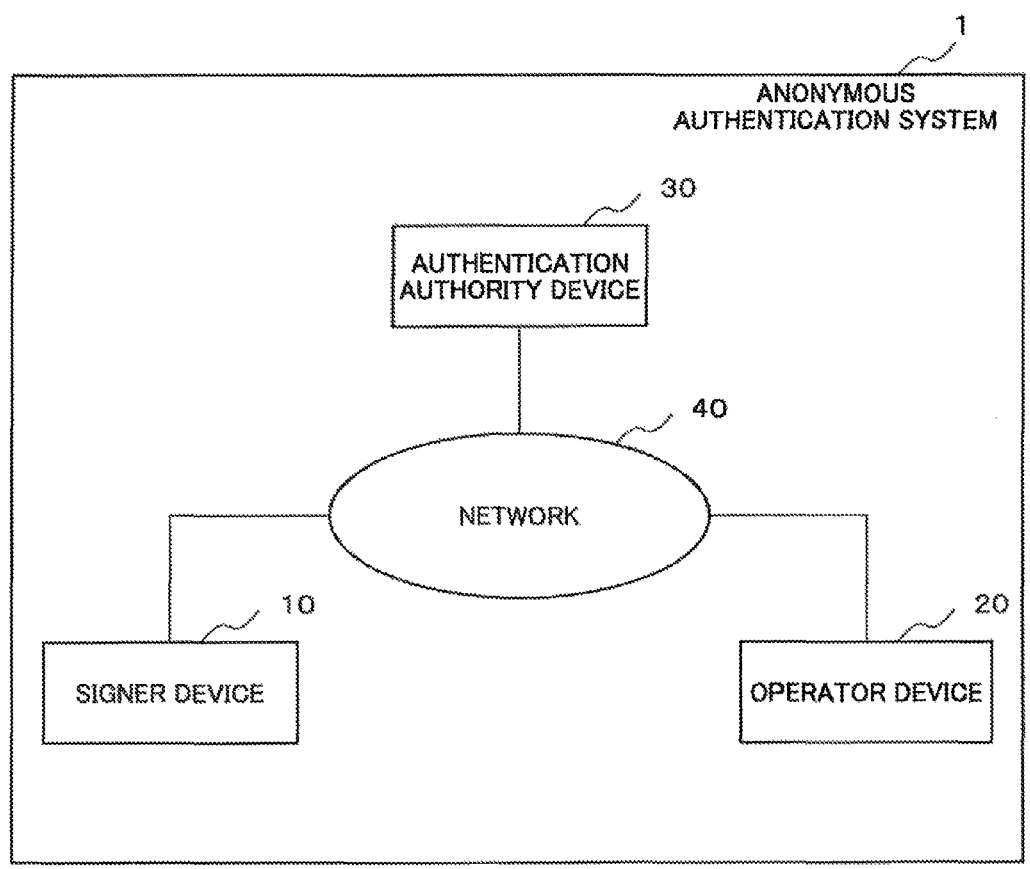
FIG. 1 An explanatory diagram illustrating a whole anonymous authentication system of an embodiment of the invention.

FIG. 1 is an explanatory diagram illustrating a whole anonymous authentication system 1 of the embodiment of the invention. The anonymous authentication system 1 is configured so that a signer device 10, an operator device 20 and an authentication authority device 30 are mutually connected through a network 40. The signer device 10 is a computer device which a signer, as a user, operates. The operator device 20 is a computer device which an operator has, who verifies whether or not the signature is proper from the anonymous authentication certificate and the signature key both received from the signer. The authentication authority device 30 is a computer device which an authentication authority has, which issues the anonymous authentication certificate and the signature key to the signer.

Figure 2:
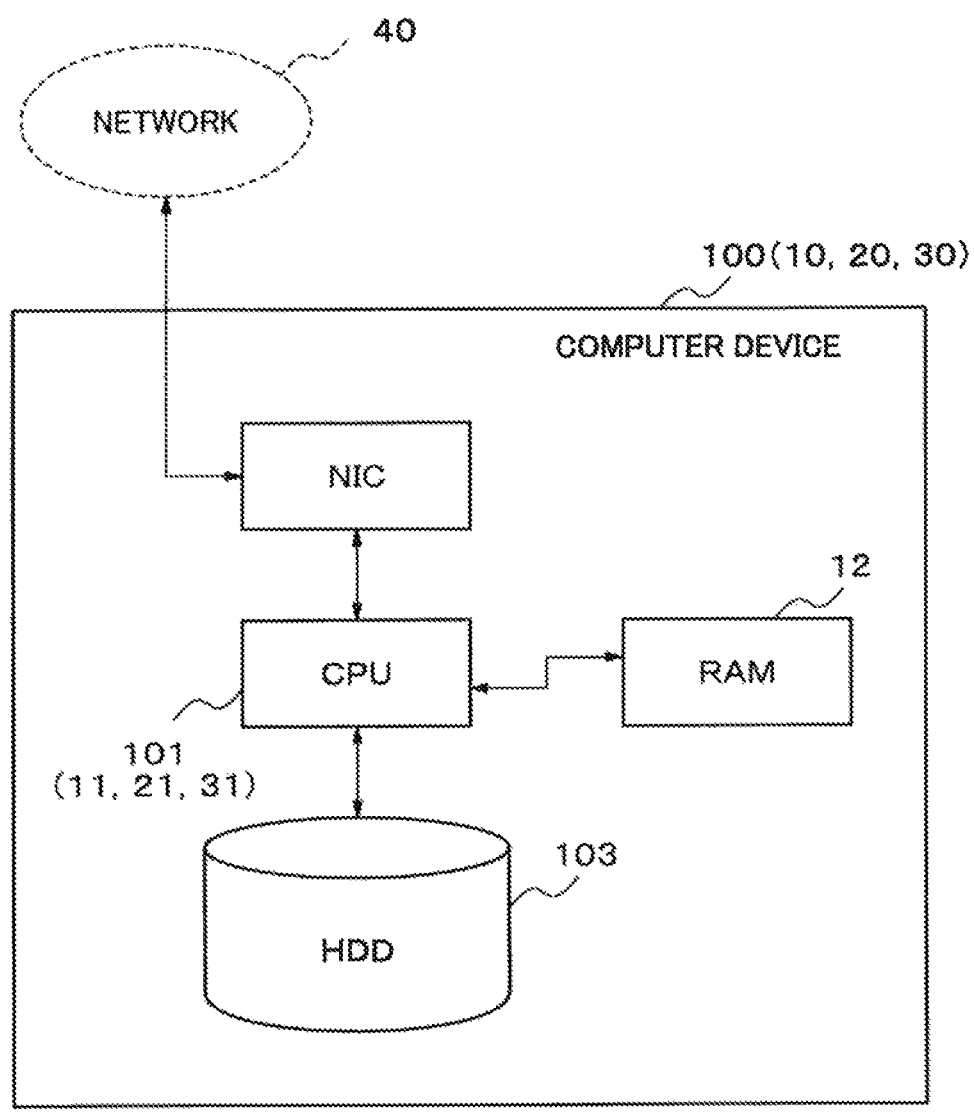
FIG. 2 An explanatory diagram illustrating a schematic configuration of a signer device, an operator device and an authentication authority device shown in FIG. 1, as hardware.

FIG. 2 is an explanatory diagram illustrating a schematic configuration of the signer device 10, the operator device 20 or the authentication authority device 30 shown in FIG. 1, as hardware. Each of these devices is an ordinary computer device 100. The computer 100 comprises a CPU (Central Processing Unit) 101 which is a main component which carried out a computer program, a RAM (Random Access Memory) 102 which is a main memory device which temporarily stores a working program and data, a HDD (Hard Disk Drive) 103 which is a non-volatile memory device, such as a hard disk device or the like, which stores programs, and a NIC (Network Interface Card) 104 which connects to the network 40 and conducts data communication with other computers.

CPUs included in the signer device 10, the operator device 20 and the authentication authority device 30 are described as a CPU 11, a CPU 21, and a CPU 31, respectively. A HDD 103 included in the authentication authority device 30 is described as a HDD 32.

FIG. 3 is an explanatory diagram illustrating a schematic configuration of each operation unit included in the signer device 10, the operator device 20 and the authentication authority device 30 shown in FIG. 1. The signer device 10 functions as the signature device 210 by the selected attributes disclosure signature unit 200 being executed as a computer program in the CPU 11 included in the signer device 10. The operator device 20 functions as the signature verification device 310 by the selected attributes disclosure signature verification unit 300 being executed as a computer program in the CPU 21 included in the operator device 20.

FIG. 3 is a diagram illustrating an example that the signer device 10 is the selected attributes disclosure signature device 210 and the operator device 20 is the selected attributes disclosure signature verification device 310. It is possible to configure so that the selected attributes disclosure signature unit 200 and the selected attributes disclosure signature verification unit 300 work in the authentication authority device 30, and the signer device 10 and the operator device 20 input data thereto and receives an output therefrom through the network 40.

The authentication authority device 30 functions as an attribute adding device, an attribute acquiring device, a tracking device, an invalidating device and a key renewal device by an attribute adding unit 410, an attribute acquiring unit 420, a tracking unit 430, an invalidating unit 440 and a key renewal unit 450, respectively, each being executed as a computer program in the CPU 31 included in the authentication authority device 30. A member list L 460 above-mentioned is stored in the HDD 32.

Signature Device

Figure 4:
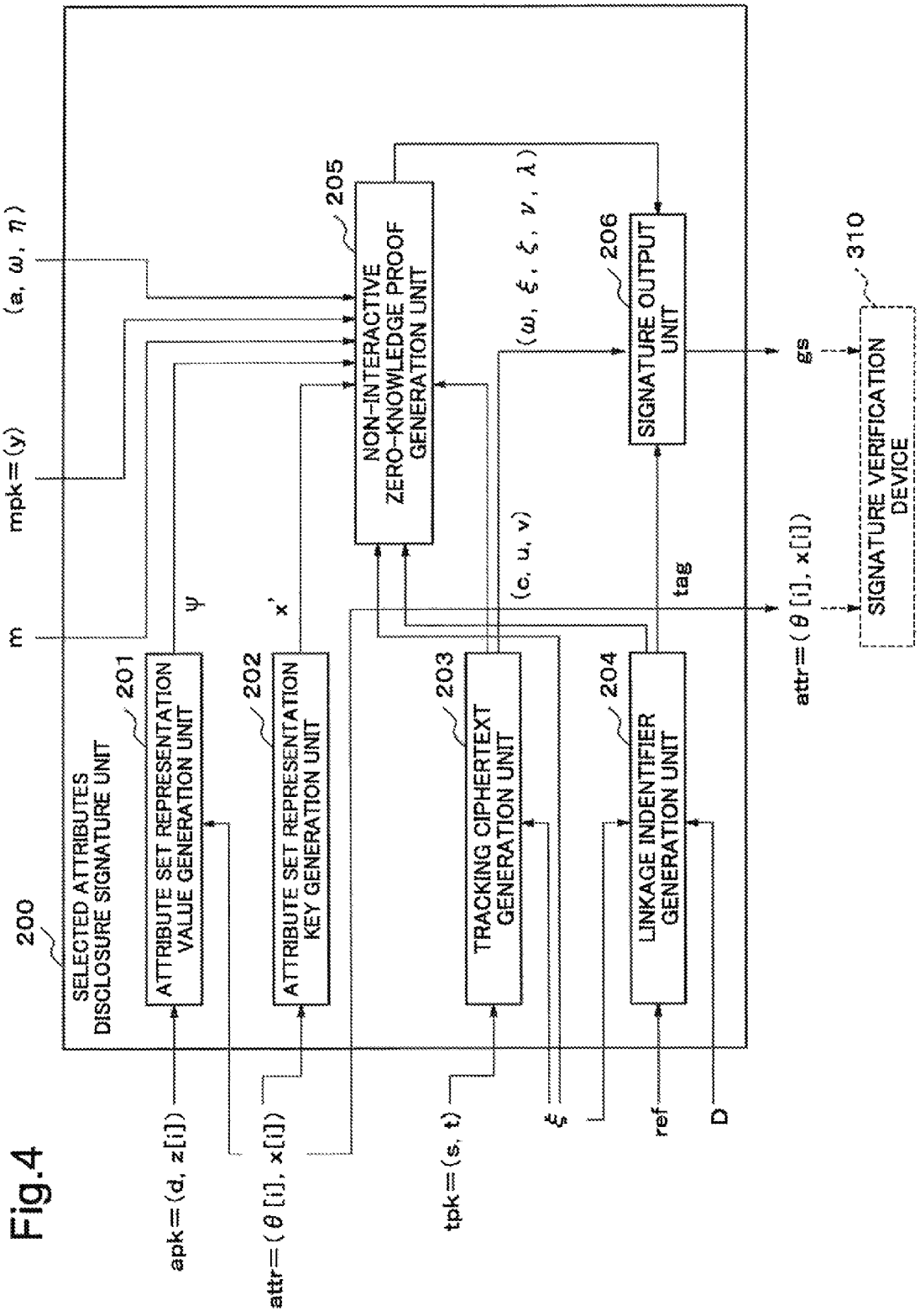
FIG. 4 An explanatory diagram illustrating a detailed configuration of the signature device shown in FIG. 1 and FIG. 3.
Figure 5:
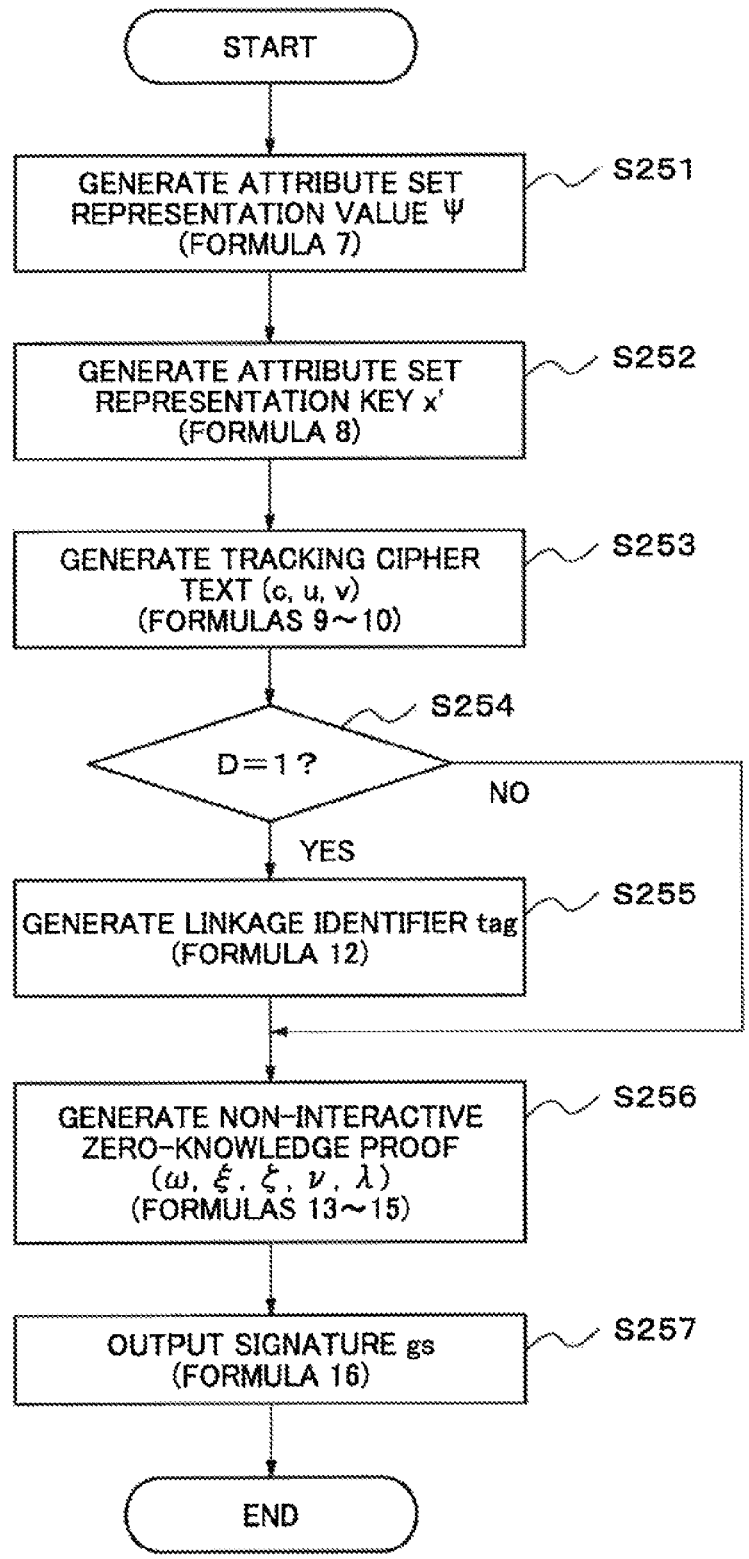
FIG. 5 A flowchart illustrating an operation of the signature device show in FIG. 4.

FIG. 4 is an explanatory diagram illustrating a detailed configuration of the signature device 210 shown in FIG. 1 and FIG. 3. FIG. 5 is a flowchart illustrating an operation of the signature device 210 show in FIG. 4. The signature device 210 includes the selected attributes disclosure signature unit 200 as described above. Public variables param (p, N, g[1], g[2], g, f, h), an authentication authority public key mpk=(y), an attribute public key apk=(d, z[i]), a tracking public key tpk=(s, t) are inputted into the selected attributes disclosure signature unit 200, where i=1, . . . , N.

A anonymous authentication certificate (a, ω, η), a signature key (ξ), a disclosed attribute proof set attr=(Θ[i], x[i]), and a text m are inputted into the selected attributes disclosure signature unit 200, where i=1, . . . , M, and M≤N. A determiner D∈{0, 1} representing whether or not linkage identifier generation is carried out is inputted into the selected attributes disclosure signature unit 200. If D=1, a linkage character string ref is simultaneously inputted.

The selected attributes disclosure signature unit 200 includes the attribute set representation value generation unit 201, the attribute set representation key generation unit 202, the tracking ciphertext generation unit 203, the linkage identifier generation unit 204, the non-interactive zero-knowledge proof generation unit 205, and the signature output unit 206. An operation of each of the units is described below.

The attribute set representation value generation unit 201 calculates all coefficients of the polynomial denoted by the formula (6) on a variable ψ.

$$\Pi_{i=1}^{M}(\psi+Hash(\Theta[i])) \quad (6)$$

And an attribute set representation value ψ denoted by the formula (7) is generated from the coefficients and z[i] (i=1, . . . , M), where ψ[k] is the k-th degree coefficient of ψ (FIG. 5: step S251).

$$\Psi=\Pi_{i=1}^{M}z[i]^{\psi[i]}=g[2]^{(\Pi_{i=1}^{M}(\psi+Hash(\Theta[i])))} \quad (7)$$

The attribute set representation key generation unit 202 generates an attribute set representation key x' denoted by the formula (8) (FIG. 5: step S252).

$$x' = \prod_{i=1}^{M} x[k]^{(1/\Pi_{i\neq k}(Hash(\Theta[i])-Hash(\Theta[k])))} \quad (8)$$

$$= (g[1]d^{-\omega})^{(1/\Pi_{i=1}^{M}(\psi+Hash(\Theta[i])))}$$

The tracking ciphertext generation unit 203 randomly selects elements μ, ν, λ of Z/pZ, generates a tracking ciphertext (c, u, v) denoted by the formula (9), and generates b and Δ denoted by the formula (10). Then, the relation denoted by the formula (11) (FIG. 5: step S253).

$$(c,u,v)=(g^{\xi+\lambda},s^{\lambda},t^{\lambda}) \quad (9)$$

$$b=ah^{\mu}$$

$$\Delta=x'g[1]^{\nu} \quad (10)$$

$$\frac{e(g[1], g[2])}{e(b, y)} = e(b, g[2])^{\omega}e(f, g[2])^{\xi}e(h, g[2])^{\eta-\omega\mu}e(h, y)^{-\nu} \quad (11)$$

$$\frac{e(g[1], g[2])}{e(\Delta, \Psi)} = e(g[1], \Psi)^{-\nu}e(d, g[2])^{\omega}$$

The linkage identifier generation unit 204 generates a linkage identifier tag denoted by the formula (12), if D=1 (FIG. 5: step S254 to 255).

$$tag=Hash[E](ref)^{\xi} \quad (12)$$

The non-interactive zero-knowledge proof generation unit 205 generates a non-interactive zero-knowledge proof of (ω, ξ, ζ, ν, λ) which satisfies each of the relations denoted by the formula (9), the formula (12), which are described above, and the formula (13). However, only if D=1, the formula (12) is considered (FIG. 5: step S256).

$$\frac{e(g[1], g[2])}{e(b, y)} = e(b, g[2])^{\omega}e(f, g[2])^{\xi}e(h, g[2])^{\zeta}e(h, y)^{-\nu} \quad (13)$$

$$\frac{e(g[1], g[2])}{e(\Delta, \Psi)} = e(g[1], \Psi)^{-\nu}e(d, g[2])^{\omega}$$

More specifically, the non-interactive zero-knowledge proof generation unit 205 initially selects elements ω', ξ', ζ', ν', λ' of Z/pZ, at random, and generates Ω', Γ', (c', u', v') and a tag' denoted by the formula (14). However, only if D=1, the tag' is generated.

$$\Omega'=e(b,g[2])^{\omega'}e(f,g[2])^{\xi'}e(h,g[2])^{\zeta'}e(h,y)^{-\nu'}$$

$$\Gamma'=e(g[1],\Psi)^{-\nu'}e(d,g[2])^{\omega'}$$

$$(c',u',v')=(g^{\xi'+\lambda'},s^{\lambda'},t^{\lambda'})$$

$$tag'=Hash[E](ref)^{\xi'} \quad (14)$$

After that, the non-interactive zero-knowledge proof generation unit 205 generates γ denoted by the formula (15). However, only if D=1, the tag' is included in an argument of Hash function of the formula (15).

$$\gamma=Hash(param,mpk,tpk,apk,attr,b,\Delta,c,u,v,\Omega',\Gamma',c',u',v', tag',m) \quad (15)$$

The non-interactive zero-knowledge proof generation unit 205 generates $\omega''$, $\xi''$, $\zeta''$, $\nu''$, $\lambda''$ denoted by the formula (16).

$$\omega''=\gamma\omega+\omega'$$

$$\xi''=\gamma\xi+\xi'$$

$$\zeta''=\gamma(\eta-\omega\nu)+\zeta'$$

$$\nu''=\gamma\nu+\nu'$$

$$\lambda''=\gamma\lambda+\lambda' \tag{16}$$

The signature output unit 206 finally outputs a gs denoted by the formula (17) as the signature with respect to the text m under disclosure of attributes $\Theta[i]$ (i=1, ..., M). However, only if D=1, the linkage identifier tag is included in the gs denoted by the formula (17).

$$gs=(b,\Delta,c,u,v,\text{tag},\gamma,\omega'',\xi'',\zeta'',\nu'',\lambda'') \tag{17}$$

Signature Verification Device

Figure 7:
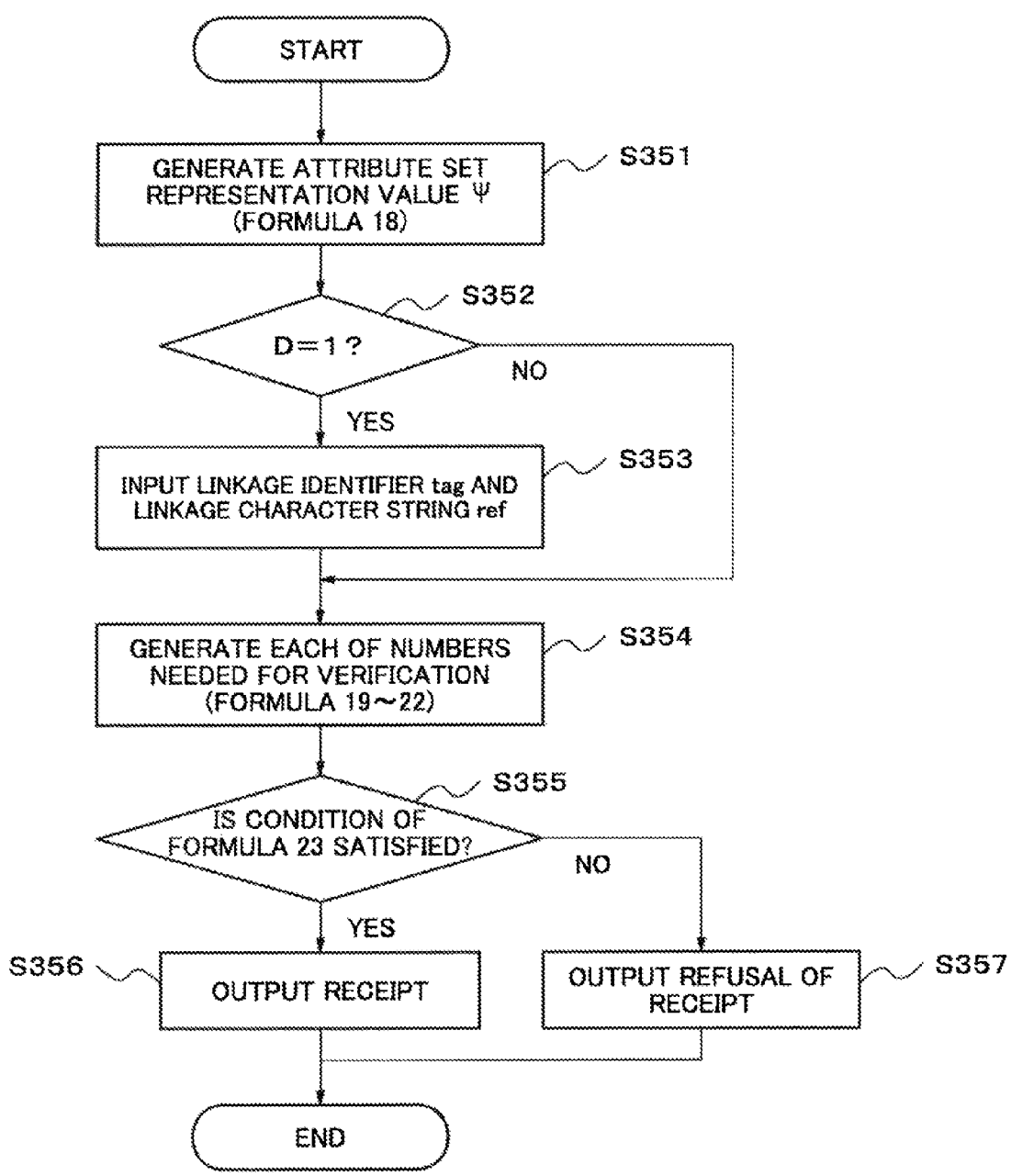
FIG. 7 A flowchart illustrating an operation of the signature verification device show in FIG. 6.

FIG. 6 is an explanatory diagram illustrating a detailed configuration of the signature verification device 310 shown in FIG. 1 and FIG. 3. FIG. 7 is a flowchart illustrating an operation of the signature verification device 310 show in FIG. 6. The signature verification device 310 includes the selected attributes disclosure signature verification unit 300 as mentioned above. The public variables (p, N, g[1], g[2], g, f, h), the authentication authority public key mpk=(y), the attribute public key apk=(d, z[i]), and the tracking public key tpk=(s, t) are inputted into the selected attributes disclosure signature verification unit 300, where i=1, ..., N.

The disclosed attributes $\Theta[i]$ (i=1, ..., M), the determiner $D \in \{0, 1\}$, the linkage character string ref, the signature gs denoted by the formula (21) are further inputted into the selected attributes disclosure signature verification unit 300, where M≤N. However, only if D=1, the linkage character string ref is inputted, and the signature includes the linkage identifier tag.

The selected attributes disclosure signature verification unit 300 includes the attribute set representation value generation unit 301, the linkage identifier and character string input unit 302, and the non-interactive zero-knowledge proof verification unit 303. An operation of each of the units is described below.

The attribute set representation value generation unit 301 calculates all coefficients of the polynomial denoted by the formula (18) on the variable $\psi$. The k-th degree coefficient of $\psi$ is denoted as $\psi[k]$. The attribute set representation value $\psi$ denoted by the formula (19) is generated from the coefficients and z[i] (i=1, ..., M) (FIG. 7: step S351).

$$\Pi_{i=1}^{M}(\psi+\text{Hash}(\Theta[i])) \tag{18}$$

$$\Psi=\Pi_{i=1}^{M}z[i]^{\psi[i]}=g[2]^{(\Pi_{i=1}^{M}(\psi+Hash(\Theta[i])))} \tag{19}$$

The non-interactive zero-knowledge proof verification unit 303 verifies whether or not $(\gamma, \omega'', \xi'', \zeta'', \nu'', \lambda'')$ included in the inputted gs are non-interactive zero-knowledge proofs of $(\omega, \xi, \zeta, \nu, \lambda)$ which satisfy the formulas (20)-(22). The signature verification device 310 outputs the verification result as a verification result. However, only if D=1, the formula (22) is calculated.

$$(c,u,v)=(g^{\xi+\lambda},s^{\lambda},t^{\lambda}) \tag{20}$$

$$\frac{e(g[1],g[2])}{e(b,y)}=e(b,g[2])^{\omega}e(f,g[2])^{\xi}e(h,g[2])^{\zeta}e(h,y)^{-\nu} \tag{21}$$

$$\frac{e(g[1],g[2])}{e(\Delta,\Psi)}=e(g[1],\Psi)^{-\nu}e(d,g[2])^{\omega}$$

$$\text{tag}=\text{Hash}[E](\text{ref})^{\xi} \tag{22}$$

More specifically, the non-interactive zero-knowledge proof verification unit 303 carried out verification of calculations denoted by the formulas (20)-(22) by generating each value according to each of equalities of the formula (23) (FIG. 7: step S354). However, only if D=1, the linkage identifier and character string input unit 302 inputs the linkage character string ref and the linkage identifier tag into the non-interactive zero-knowledge proof verification unit 303 (FIG. 7: step S352-353). The non-interactive zero-knowledge proof verification unit 303 generates the tag' from the inputted ref and the inputted tag.

$$\Omega' = e(b,g[2])^{\omega''}e(f,g[2])^{\xi''}e(h,y)^{-\nu''}\left(\frac{e(g[1],g[2])}{e(b,y)}\right)^{-\gamma} \tag{23}$$

$$\Gamma' = e(g[1],\psi)^{-\nu''}e(d,g[2])^{\omega''}\left(\frac{e(g[1],g[2])}{e(\Delta,\Psi)}\right)^{-\gamma}$$

$$(c',u',v') = \left(g^{\xi''+\lambda''}c^{-\gamma},s^{\lambda''}u^{-\gamma},t^{\lambda''}v^{-\gamma}\right)$$

$$\text{tag}' = \text{tag}^{\xi''}\text{Hash}[E](\text{ref})^{-\gamma}$$

The non-interactive zero-knowledge proof verification unit 303 verifies whether or not these values satisfy the condition shown in the formula (24) (FIG. 7: step S355). However, only if D=1, the tag' is included in the argument of Hash function shown in the formula (24). If the condition of the formula (24) is satisfied, data representing "receipt" is outputted (FIG. 7: step S356), and if not, data representing "refusal of receipt" is outputted (FIG. 7: step S357).

$$\gamma=\text{Hash}(\text{param},\text{mpk},\text{tpk},\text{apk},\text{attr},b,\Delta,c,u,v,\Omega',c',u',v',\text{tag}',m) \tag{24}$$

Authentication Authority Device

Each of operations of the attribute adding unit 410, the attribute acquiring unit 420, the tracking unit 430, the invalidating unit 440 and the key renewal unit 450 which operate in the authentication authority device 30 of FIG. 3 is described. Each of the public variables param (p, N, g[1], g[2], g, f, h), the authentication authority public key mpk=(y), the attribute public key apk=(d, z[i]), the attribute secret key, the attribute $\Theta \in \{0, 1\}^*$, the signer information (q, $\omega$) is inputted into the attribute adding unit 410. The attribute adding unit 410 generates $\theta$=Hash ($\Theta$) from the inputted information, generates an attribute key x based on the calculation of the formula (25) and outputs the attribute proof ($\Theta$, x).

$$x=(g[1]d^{-\omega})^{1/(q\psi+\Theta)} \tag{25}$$

Each of the public variables param (p, N, g[1], g[2], g, f, h), the authentication authority public key mpk=(y), the attribute public key apk=(d, z[i]), the signer information (q, $\omega$), and the attribute proof ($\Theta$, x) is inputted into the attribute acquiring unit 420. After confirming that the condition denoted by the formula (26) holds, the attribute acquiring unit 420 stores the attribute proof (Θ, x).

$$e(x,z[1]g[2]^{Hash(\Theta)})e(d^\omega,g[2])=e(g[1],g[2]) \quad (26)$$

Each of the public variables param which are character strings and (p, N, g[1], g[2], g, f, h), the authentication authority public key mpk=(y), the attribute public key apk=(d, z[i]) (i=1, . . . , N), the tracking public key tpk=(s, t), the tracking secret key tsk=(σ, τ), the signature gs denoted by the formula (27), and the member list L 460 is inputted into the tracking unit 430, where M≤N.

$$gs((\Theta[i])_{i=1,\ldots,M},b,\Delta,c,u,v,\text{tag},\gamma,\omega'',\xi'',\zeta'',v'',\lambda'') \quad (27)$$

The tracking unit 430 generates q denoted by the formula (28), searches the signer information including it from the member list L 460 and outputs. The non-interactive zero-knowledge proof prf on existence of σ which satisfies the condition denoted by the formula (29) is generated and outputted.

$$q=cu^{-\sigma} \quad (28)$$

$$u=(q/c)^\sigma$$

$$t=g^\sigma \quad (29)$$

Each of the public variables param which are character strings and (p, N, g[1], g[2], g, f, h), the authentication authority public key mpk=(y), and the authentication authority secret key sk=ϕ, and further the member list L 460, and the signer information (q', ω') on an invalidated signer are inputted into the invalidating unit 440.

The invalidating unit 440 confirms that U' and attr' exist in the member list 460, and generates each of data denoted by the formula (30) thereon. After that, ω' and (g'[1], f', h') are outputted as invalidation information.

$$g'[1]=g[1]^{1/(\phi+\omega')}$$

$$f'=f^{1/(\phi+\omega')}$$

$$h'=h^{1/(\phi+\omega')} \quad (30)$$

Each of the public variables param which are character strings and (p, N, g[1], g[2], g, f, h), and the authentication authority public key mpk=(y), and further the anonymous authentication certificate (a, ω, η), the signer key (ξ), and an invalidation information (ω', (g'[1], f', h')) are inputted into the key renewal unit 450.

The key renewal unit 450 generates a' denoted by the formula (31) and outputs the new anonymous authentication certificate (a', ω, η) as the renewed one of the anonymous authentication certificate (a, ω, η).

$$a'=(ag'[1]^{-1}f^{-\xi}h^m)^{1/(\omega'-\omega)} \quad (31)$$

FIG. 8 is an explanatory diagram illustrating a configuration on an operation of each operation unit of the anonymous authentication signature system 1 shown in FIG. 1 and FIG. 3. The public variables param (p, N, g[1], g[2], g, f, h), the attribute public key apk=(d, z[i]), the authentication authority public key mpk=(y), and the tracking public key tpk=(s, t) are disclosed for the whole of the anonymous authentication system 1 in advance, held by each device, otherwise are able to be referred.

Only the authentication authority device 30 stores the member list L 460, the authentication authority secret key, the attribute secret key, and the tracking secret key, which are not disclosed to the signer device 10 and the operator device 20. The signature key (ξ) is given to the signer device 10 in advance.

The public variables param (p, N, g[1], g[2], f, h), the authentication authority public key mpk=(y), the attribute secret key, and the attribute public key apk=(d, z[i]) are inputted into the attribute adding unit 410.

Each of the public variables param (p, N, g[1], g[2], g, f, h), the authentication authority public key mpk=(y), the attribute public key apk=(d, z[i]), and the tracking public key tpk=(s, t) is inputted into the signature verification device 310 shown in FIG. 6 as mentioned above.

Each of the public variables param (p, N, g[1], g[2], g, f, h), the authentication authority public key mpk=(y), the attribute public key apk=(d, z[i]), the tracking secret key, and the tracking public key tpk=(s, t) is inputted into the tracking unit 430.

Each of the public variables param (p, N, g[1], g[2], f, h), the authentication authority secret key, and the authentication authority public key mpk=(y) is inputted into the invalidating unit 440.

Each of the public variables param (p, N, g[1], g[2], g, f, h), the authentication authority public key mpk=(y), the attribute public key apk=(d, z[i]), the signer information (q, ω), and the attribute proof (Θ, x) is inputted into the attribute acquiring unit 420.

Each of the public variables param (p, N, g[1], g[2], g, f, h), the authentication authority public key mpk=(y). the attribute public key apk=(d, z[i]), and the tracking public key tpk=(s, t) is inputted into the signature device 210 shown in FIG. 4 as mentioned above.

Each of the public variables param (p, N, g[1], g[2], g, f, h), the authentication authority public key mpk=(y), the attribute public key apk=(d, z[i]), and the tracking public key tpk=(s, t) is inputted into the key renewal unit 450.

When signer information (q, ω) and attributes Θ∈{0, 1}* are inputted, the attribute adding unit 410 conducts calculation denoted in the formula (25) and outputs the attribute proof (Θ, x). The attribute proof (Θ, x) is sent to the attribute acquiring unit 420 which is prepared in response to the inputted signer information (q, ω). The attribute acquiring unit 420 confirms that the condition denoted in the formula (26) described above holds with respect to the inputted attribute proof (Θ, x).

In response to the signer information (q, ω), the attribute adding unit 410 generates the attribute proof (Θ, x) and the attribute acquiring unit 420 confirms and stores the attribute proof (Θ, x). The attribute proof set attr=(Θ[i], x[i]) comprising a combination of a plurality of the confirmed and stored attribute proofs is inputted into the signature device 210 in response to the signer information (q, ω).

When the text m, the linkage character string ref, the determiner D, the attribute proof set attr=(Θ[i], x[i]) to be disclosed, the anonymous authentication certificate (a, ω, η), and the signature key (ξ) are inputted, the signature device 210 generates the signature gs according to the operation mentioned above.

When the signature gs generated by the signature device 210, the disclosed attributes Θ[i], and the text m are inputted into the signature verification device 310, the signature verification device 310 outputs data representing "receipt" or "refusal of receipt" according to the operation mentioned above.

When the member list L 460, the signature gs generated by the signature device 210, and the disclosed attributes Θ[i] are inputted, the tracking unit 430 searches the signer information (q, ω) including q denoted by the formula (28) from the member list L 460 and outputs according to the operation mentioned above.

When the member list L 460 and the signer information (q', ω') corresponding to an invalidated member (signer) are inputted into the invalidating unit 440, ω' and (g'[1], f', h') both denoted by the formula (30) are outputted as the invalidation information according to the operation mentioned above.

When the anonymous authentication certificate (a, ω, η), the invalidation information ω', and (g'[1], f', h') are inputted into the key renewal unit 450, calculations denoted by the formula (31) are conducted according to the operation described above, and the new anonymous authentication certificate (a', ω, η) is outputted. The new anonymous authentication certificate (a', ω, η) is inputted into the signature device 210.

Whole Operations of the Embodiment

Next, whole operations of the embodiment above are described. The signing method of the invention described below is a method which generates the signature data using the signature device 210. The signature device 210 initially receives inputs of the authentication authority public key, the anonymous authentication certificate, the signature key, the text, the attribute proof set, and the attribute public key. Next, the signature device 210 generates the attribute set representation value from the inputted attribute proof set and the inputted attribute public key (FIG. 5: step S251). The signature device 210 generates the attribute set representation key from the attribute proof set (FIG. 5: step S252). The signature device 210 further generates the non-interactive zero-knowledge proof from the authentication authority public key, the anonymous authentication certificate, the signature key, the text, the attribute set representation value, and the attribute set representation key, which are inputted therein (FIG. 5: step S256). The signature device 210 outputs the non-interactive zero-knowledge proof as the signature data (FIG. 5: step S257).

The signature verification method of the invention described below is the signature verification method including verifying whether or not the signature data is proper by using the signature verification device 310 and outputting the result thereof. Initially, the signature verification device 310 receives inputs of the authentication authority public key, the attribute public key, the attribute, the text, and the signature data including the non-interactive zero-knowledge proof. Next, the signature verification device 310 generates the attribute set representation value from the inputted attribute and the attribute public key (FIG. 7: step S351). And, the signature verification device 310 determines whether or not the signature data is a proper signature with respect to the text under disclosure of the attributes by the authentication authority public key, the attribute set representation value, and the text (FIG. 7; step S354 to S355), and outputs the result thereof (FIG. 7: step S356 to S357).

The signature device 210 or the signature verification device 310, which is a component directly executing each of the steps, may execute the program in which each of the operational steps mentioned above is programmed so as to be executable on a computer.

Due to the configuration and the operation, the embodiment has the advantages described below.

The anonymous authentication system 1 of the embodiment can unlimitedly generates the attribute proof (Θ, x) corresponding to (q, ω) by the attribute adding unit 410. A signer who receives the attribute proof (Θ, x) at the attribute acquiring unit 420 can disclose any attributes Θ[i] in attr=(Θ[i], x[i]) together with the signature gs to be generated, by using the signature device 210.

The signature verification device 310 can verify whether or not the signature gs, the disclosed attributes Θ[i], and the text m are proper. And, the tracking unit 430 can search and take the signer information (q, ω) in the member list L 460 through the signature gs.

In the embodiment, regarding the signature gs which the signature device 210 generates, calculation amount for the generation thereof only increases in proportion to the number of disclosed attributes, and the length of the signature does not increase depending on the number of attributes associated with the signer information. Though the number of the attributes which are able to be disclosed at once is limited to the number not greater than a predetermined number N, it does not matter for operation for using the anonymous authentication system.

The minimum configuration of the signature device of the invention is a configuration including a unit which receives inputs of the authentication authority public key, the anonymous authentication certificate, the signature key, the text, the attribute proof set, and the attribute public key, the attribute set representation value generation unit 201, the attribute set representation key generation unit 202, the non-interactive zero-knowledge proof generation unit 205, and the signature output unit 206. The attribute set representation value generation unit 201 generates the attribute set representation value from the inputted attribute proof set and the inputted attribute public key. The attribute set representation key generation unit 202 generates the attribute set representation key from the attribute proof set which the attribute set representation value generation unit 201 generates. The non-interactive zero-knowledge proof generation unit 205 generates the non-interactive zero-knowledge proof from the authentication authority public key, the anonymous authentication certificate, the signature key, the text, which are inputted therein, and the attribute set representation value, and the attribute set representation key. The signature output unit 206 outputs the non-interactive zero-knowledge proof as the signature data.

The signature device with the configuration described above generates the attribute set representation value representing the whole attributes to be disclosed and the corresponding attribute public key as one value, and the attribute set representation key corresponding to the attribute set representation value. The signature device generates the non-interactive zero-knowledge proof from data including the generated attribute set representation value and the generated attribute set representation key and outputs as the signature data. Because the non-interactive zero-knowledge proof does not include a value corresponding to each of attributes, a data size of the non-interactive zero-knowledge proof is not affected by the number of the attributes.

Therefore, the signature device with the minimum configuration described above has an advantage that the length of the signature is not affected by the number of the attributes.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The application is based upon and claims the benefit of priority from Japanese patent application No. 2009-130644, filed on May 29, 2009, the disclosure of which is incorporated herein in its entirety by reference.

INDUSTRIAL APPLICABILITY

The invention can be applied to a system and a device using anonymous authentication.

The invention claimed is:

1. A signature device comprising:
a unit for receiving inputs of an authentication authority public key, an anonymous authentication certificate, a signature key, a text, an attribute proof set, and an attribute public key;
an attribute set representation value generation unit for generating an attribute set representation value from the inputted attribute proof set and the inputted attribute public key;
an attribute set representation key generation unit for generating an attribute set representation key from the attribute proof set;
a non-interactive zero-knowledge proof generation unit for generating a non-interactive zero-knowledge proof from the inputted authentication authority public key, the inputted anonymous authentication certificate, the inputted signature key, the inputted text, the attribute set representation value generated by the attribute set representation value generation unit, and the attribute set representation key generated by the attribute set representation key generation unit; and
a signature output unit for outputting the non-interactive zero-knowledge proof as signature data, wherein
the attribute proof set is a set of one or more pairs of an attribute and an attribute key,
the attribute public key comprises elements of a cyclic group, wherein the number of the elements is proportional to the number of the attributes that are simultaneously disclosable,
the attribute set representation value is the sum of results acquired by multiplying each element of the attribute public key by a coefficient calculated from values of the attributes included in the attribute proof set, and
the attribute set representation key is the sum of results acquired by multiplying each element of the attribute key included in the attribute proof set by a coefficient calculated from values of the attributes included in the attribute proof set.

2. The signature device of claim 1, further comprising:
a tracking ciphertext generation unit for inputting random numbers and generating a tracking ciphertext from the random numbers, a inputted tracking public key, the authentication authority public key, and the signature key,
wherein the non-interactive zero-knowledge proof generation unit generates the non-interactive zero-knowledge proof from the authentication authority public key, the anonymous authentication certificate, the signature key, the text, the attribute set representation value, the attribute set representation key, the tracking ciphertext, and the random numbers.

3. The signature device of claim 1, further comprising:
a linkage identifier generation unit for generating a linkage identifier from the inputted authentication authority public key, a inputted determiner for indicating whether or not the linkage identifier is generated, and a inputted linkage character string,
wherein the non-interactive zero-knowledge proof generation unit generates the non-interactive zero-knowledge proof from the authentication authority public key, the anonymous authentication certificate, the signature key, the text, the attribute set representation value, the attribute set representation key, the linkage character string, the linkage identifier, and the random numbers.

4. A signature verification device, comprising:
a unit for receiving inputs of an authentication authority public key, an attribute public key, one or more attributes, a text, and signature data including a non-interactive zero-knowledge proof;
an attribute set representation value generation unit for generating an attribute set representation value from the inputted attributes and the inputted attribute public key; and
a non-interactive zero-knowledge proof verification unit for determining whether or not the signature data is a proper signature with respect to the text under disclosure of the attributes by the authentication authority public key, the text, and the attribute set representation value generated by the attribute set representation value generation unit and for outputting the result of the determination, wherein
the attribute public key comprises elements of a cyclic group, wherein the number of the elements is plural and proportional to the number of the attributes simultaneously disclosable, and
the attribute set representation value is the sum of results acquired by multiplying each element of the attribute key by a coefficient calculated from values of the attributes.

5. The signature verification device of claim 4, wherein the non-interactive zero-knowledge proof verification unit determines whether or not the signature data is the proper signature with respect to the text by the authentication authority public key, the attribute set representation value, the text, a tracking public key, and a tracking ciphertext.

6. The signature verification device of claim 4, further comprising:
a linkage identifier and character string input unit for receiving a linkage identifier, a linkage character string and a determiner indicating whether or not the linkage character string is generated, and for inputting the linkage identifier and the linkage character string into the non-interactive zero-knowledge proof verification unit depending on a value of the determiner,
wherein the non-interactive zero-knowledge proof verification unit determines whether or not the signature data is the proper signature with respect to the text by the authentication authority public key, the attribute set representation value, the text, the linkage identifier, and the linkage character string.

7. An anonymous authentication system, comprising:
a signature device that is characterized in comprising:
a unit for receiving inputs of an authentication authority public key, an anonymous authentication certificate, a signature key, a text, an attribute proof set, and an attribute public key;
an attribute set representation value generation unit for generating an attribute set representation value from the attribute proof set and the attribute public key;
an attribute set representation key generation unit for generating an attribute set representation key from the attribute proof set;
a non-interactive zero-knowledge proof generation unit for generating non-interactive zero-knowledge proof from the authentication authority public key, the anonymous authentication certificate, the signature key, the attribute set representation value generated by the attribute set representation value generation unit, and the attribute set representation key generated by the attribute set representation key generation unit; and a signature output unit for outputting the non-interactive zero-knowledge proof as signature data; and a signature verification device that is characterized in comprising:

a unit for receiving inputs of the authentication authority public key, the attribute public key, one or more attributes, the text, and the signature data including the non-interactive zero-knowledge proof;

an attribute set representation value generation unit for generating the attribute set representation value from the attributes and the attribute public key; and a non-interactive zero-knowledge proof verification unit for determining whether or not the signature data is a proper signature with respect to the text under disclosure of the attributes by the authentication authority public key, the text, and the attribute set representation value generated by the attribute set representation value generation unit, and for outputting the result of the determination, wherein the attribute proof set is a set of one or more pairs of an attribute and an attribute key, the attribute public key comprises elements of a cyclic group, wherein the number of the elements is plural and proportional to the number of the attributes that are simultaneously disclosable, the attribute set representation value is the sum of results acquired by multiplying each element of the attribute public key by a coefficient calculated from values of the attributes included in the attribute proof set, and the attribute set representation key is the sum of results acquired by multiplying each element of the attribute key included in the attribute proof set by a coefficient calculated from values of the attributes included in the attribute proof set.

8. The anonymous authentication system of claim 7, further comprising: an authentication authority device that is connected to the signature device and the signature verification device; wherein the authentication authority device comprises an attribute adding unit for inputting the authentication authority public key, an attribute secret key, the attribute public key, an member list, signer information, and the attributes and generating an attribute proof from the inputted authentication authority public key, the inputted attribute secret key, the inputted attribute public key, the inputted member list, the inputted signer information, and the inputted attributes, and an attribute acquiring unit for inputting the authentication authority public key, the attribute public key, and the attribute proof and outputting data representing rejection or receipt from the inputted authentication authority public key, the inputted attribute public key, and the inputted attribute proof.

9. The anonymous authentication system of claim 8, wherein the signature device comprises tracking ciphertext generation unit for inputting random numbers and generating a tracking ciphertext from the inputted random numbers, a tracking public key, the authentication authority public key, and the signature key, and the non-interactive zero-knowledge proof generation unit generates the non-interactive zero-knowledge proof from the authentication authority public key, the anonymous authentication certificate, the signature key, the text, the attribute set representation value, the attribute set representation key, the tracking ciphertext, and the random numbers, the non-interactive zero-knowledge proof verification unit in the signature verification device determines whether or not the signature data is the proper signature with respect to the text by the authentication authority public key, the attribute set representation value, the text, a tracking public key, and a tracking ciphertext, and the authentication authority device comprises a tracking unit for generating the signer information from the authentication authority public key, the attribute public key, the tracking secret key, the tracking public key, the member list, the signature, and a message, an invalidating unit for generating invalidation information from an authentication authority secret key, the authentication authority public key, the member list, and a part of the signer information, and a key renewing unit for renewing the anonymous authentication certificate from the authentication authority public key, the attribute public key, the signature key, the anonymous authentication certificate, and the invalidation information.

10. A signing method comprising:

receiving inputs of an authentication authority public key, an anonymous authentication certificate, a signature key, a text, an attribute proof set, and an attribute public key;

generating an attribute set representation value from the attribute proof set and the attribute public key;

generating an attribute set representation key from the attribute proof set;

generating a non-interactive zero-knowledge proof from the authentication authority public key, the anonymous authentication certificate, the signature key, the text, the generated attribute set representation value, and the generated attribute set representation key; and outputting the non-interactive zero-knowledge proof as signature data, wherein the attribute proof set is a set of one or more pairs of an attribute and an attribute key, the attribute public key comprises elements of a cyclic group, wherein the number of the elements is proportional to the number of the attributes that are simultaneously disclosable, the attribute set representation value is the sum of results acquired by multiplying each element of the attribute public key by a coefficient calculated from values of the attributes included in the attribute proof set, and the attribute set representation key is the sum of results acquired by multiplying each element of the attribute key included in the attribute proof set by a coefficient calculated from values of the attributes included in the attribute proof set.

11. A signature authentication method comprising:

receiving inputs of an authentication authority public key, an attribute public key, one or more attributes, a text, and signature data including a non-interactive zero-knowledge proof;

generating an attribute set representation value from the attributes and the attribute public key; and determining whether or not the signature data is a proper signature with respect to the text under disclosure of the attributes by the authentication authority public key, the text, and the generated attribute set representation value, and outputting the result of the determination, wherein the attribute public key comprises elements of a cyclic group, wherein the number of the elements is plural and proportional to the number of the attributes simultaneously disclosable, and the attribute set representation value is the sum of results acquired by multiplying each element of the attribute key by a coefficient calculated from values of the attributes.

12. A non-transitory computer readable medium embodying a signature program causing a computer to execute:
   a step of receiving inputs of an authentication authority public key, an anonymous authentication certificate, a signature key, a text, an attribute proof set, and an attribute public key;
   a step of generating an attribute set representation value from the attribute proof set and the attribute public key;
   a step of generating an attribute set representation key from the attribute proof set;
   a step of generating a non-interactive zero-knowledge proof from the authentication authority public key, the anonymous authentication certificate, the signature key, the text, the generated attribute set representation value, and the generated attribute set representation key; and
   a step of outputting the non-interactive zero-knowledge proof as the signature data, wherein
   the attribute proof set is a set of one or more pairs of an attribute and an attribute key,
   the attribute public key comprises elements of a cyclic group, wherein the number of the elements is proportional to the number of the attributes that are simultaneously disclosable,
   the attribute set representation value is the sum of results acquired by multiplying each element of the attribute public key by a coefficient calculated from values of the attributes included in the attribute proof set, and
   the attribute set representation key is the sum of results acquired by multiplying each element of the attribute key included in the attribute proof set by a coefficient calculated from values of the attributes included in the attribute proof set.

13. A non-transitory computer readable medium embodying a signature verification program causing a computer to execute:
   a step of receiving inputs of an authentication authority public key, an attribute public key, one or more attributes, a text, and signature data including a non-interactive zero-knowledge proof;
   a step of generating an attribute set representation value from the attributes and the attribute public key; and
   a step of determining whether or not the signature data is a proper signature with respect to the text under disclosure of the attributes by the authentication authority public key, the text, and the generated attribute set representation value, and outputting the determined result, wherein
   the attribute public key comprises elements of a cyclic group, wherein the number of the elements is plural and proportional to the number of the attributes simultaneously disclosable, and
   the attribute set representation value is the sum of results acquired by multiplying each element of the attribute key by a coefficient calculated from values of the attributes.

14. A signature device comprising:
   means for receiving inputs of an authentication authority public key, an anonymous authentication certificate, a signature key, a text, an attribute proof set, and an attribute public key;
   attribute set representation value generation means for generating an attribute set representation value from the inputted attribute proof set and the inputted attribute public key;
   attribute set representation key generation means for generating an attribute set representation key from the attribute proof set;
   non-interactive zero-knowledge proof generation means for generating a non-interactive zero-knowledge proof from the inputted authentication authority public key, the inputted anonymous authentication certificate, the inputted signature key, the inputted text, the attribute set representation value generated by the attribute set representation value generation means, and the attribute set representation key generated by the attribute set representation key generation means; and
   signature output means for outputting the non-interactive zero-knowledge proof as signature data, wherein
   the attribute proof set is a set of one or more pairs of an attribute and an attribute key,
   the attribute public key comprises elements of a cyclic group, wherein the number of the elements is proportional to the number of the attributes that are simultaneously disclosable,
   the attribute set representation value is the sum of results acquired by multiplying each element of the attribute public key by a coefficient calculated from values of the attributes included in the attribute proof set, and
   the attribute set representation key is the sum of results acquired by multiplying each element of the attribute key included in the attribute proof set by a coefficient calculated from values of the attributes included in the attribute proof set.

15. A signature verification device, comprising:
   means for receiving inputs of an authentication authority public key, an attribute public key, one or more attributes, a text, and signature data including a non-interactive zero-knowledge proof;
   attribute set representation value generation means for generating an attribute set representation value from the inputted attributes and the inputted attribute public key; and
   non-interactive zero-knowledge proof verification means for determining whether or not the signature data is a proper signature with respect to the text under disclosure of the attributes by the authentication authority public key, the text, and the attribute set representation value generated by the attribute set representation value generation means and for outputting the result of the determination, wherein
   the attribute public key comprises elements of a cyclic group, wherein the number of the elements is plural and proportional to the number of the attributes simultaneously disclosable, and
   the attribute set representation value is the sum of results acquired by multiplying each element of the attribute key by a coefficient calculated from values of the attributes.

16. An anonymous authentication system, comprising:
   a signature device that is characterized in comprising:
   means for receiving inputs of an authentication authority public key, an anonymous authentication certificate, a signature key, a text, an attribute proof set, and an attribute public key;
   attribute set representation value generation means for generating an attribute set representation value from the attribute proof set and the attribute public key;

attribute set representation key generation means for generating an attribute set representation key from the attribute proof set;

non-interactive zero-knowledge proof generation means for generating non-interactive zero-knowledge proof from the authentication authority public key, the anonymous authentication certificate, the signature key, the attribute set representation value generated by the attribute set representation value generation means, and the attribute set representation key generated by the attribute set representation key generation means; and signature output means for outputting the non-interactive zero-knowledge proof as signature data; and a signature verification device that is characterized in comprising:

means for receiving inputs of the authentication authority public key, the attribute public key, one or more attributes, the text, and the signature data including the non-interactive zero-knowledge proof;

attribute set representation value generation means for generating the attribute set representation value from the attributes and the attribute public key; and non-interactive zero-knowledge proof verification means for determining whether or not the signature data is a proper signature with respect to the text under disclosure of the attributes by the authentication authority public key, the text, and the attribute set representation value generated by the attribute set representation value generation means, and for outputting the result of the determination, wherein the attribute proof set is a set of one or more pairs of an attribute and an attribute key, the attribute public key comprises elements of a cyclic group, wherein the number of the elements is plural and proportional to the number of the attributes that are simultaneously disclosable, the attribute set representation value is the sum of results acquired by multiplying each element of the attribute public key by a coefficient calculated from values of the attributes included in the attribute proof set, and the attribute set representation key is the sum of results acquired by multiplying each element of the attribute key included in the attribute proof set by a coefficient calculated from values of the attributes included in the attribute proof set.

* * * * *